United States Patent [19]

Silvers

[11] Patent Number: 5,370,241
[45] Date of Patent: Dec. 6, 1994

[54] HOLDER FOR ELECTRONIC REMOTE CONTROLS

[76] Inventor: Michael J. Silvers, 2100 Lee Hwy Apt. G6, Arlington, Va. 22201

[21] Appl. No.: 166,862

[22] Filed: Dec. 15, 1993

[51] Int. Cl.⁵ ............................................. A47F 5/00
[52] U.S. Cl. ........................................ 211/13; 211/150; 248/176; 248/205.2
[58] Field of Search ............... 211/150, 86, 13, 196; 248/176, 205.2, 127, 174; D6/474, 477, 478, 479, 570

[56] References Cited

U.S. PATENT DOCUMENTS

| | | | |
|---|---|---|---|
| 1,856,935 | 5/1932 | Turner | 211/150 X |
| 3,045,831 | 7/1962 | Pendergrast et al. | 211/150 X |
| 4,660,792 | 4/1987 | Rogalski | 248/174 |
| 4,712,693 | 12/1987 | Striplin | 211/164 |
| 4,852,746 | 8/1989 | Wells et al. | 248/205.2 X |
| 5,125,516 | 6/1992 | McKenna | 211/13 |
| 5,127,615 | 7/1992 | Jones | 248/172 |
| 5,192,042 | 3/1993 | Wotring et al. | 248/176 |
| 5,244,173 | 9/1993 | Kulyk | 248/176 |

*Primary Examiner*—Robert W. Gibson, Jr.
*Attorney, Agent, or Firm*—Kenneth S. Watkins, Jr.

[57] ABSTRACT

An improved holder for remote controls is disclosed which houses at least two remote controls. The holder includes at least two shelves, one shelf for each remote control. Folding shelves connect to a vertical support member of the holder by means of a pivotal fastening means such as a hinge which permits the user to raise the upper shelves to gain access to remote controls on the lower shelves. Each shelf is fitted with a hook and loop fastener strip and each remote control is fitted with a matching hook and loop fastener strip on the back of the remote control.

7 Claims, 1 Drawing Sheet

HOLDER FOR ELECTRONIC REMOTE CONTROLS

BACKGROUND

This invention relates to a holder for electronic remote controls of the type used with home entertainment devices.

Remote controls for home entertainment devices have become increasingly popular. Homes may have remote controls for the television, video cassette recorder, compact disc player, phonograph, AM/FM receiver, audio cassette player, and other home entertainment devices.

Although these remote controls offer a convenient means of controlling home entertainment devices, the remote controls themselves are frequently misplaced under cushions and magazines, on nearby tables, and even in other areas of the house. Because the user may have a number of remote controls, he/she may be unaware a remote control is missing until it is urgently needed. A holder is vital which will organize a large number of remote controls in a way which alerts the user if one or more remote controls are missing.

A number of devices have been used in the past to consolidate the growing number of remote controls. Prior art includes holders for remote controls which hold a small number of remote controls in a set framework. Although a quick visual inspection of these small holders alerts the user if one remote control is missing, the holder will not accommodate the large number of remote controls now owned by many households.

Other previous patents disclose holders for remote controls which are flexible to accommodate a large number of remote controls. However, the holders for large numbers of remote controls merely hold them together without any scheme to insure each remote control has its own location in the holder and which would allow the user to detect, at a glance, if any remote controls are missing.

So called "universal" remote controls have not alleviated the problem of multiple remotes due to complexity, cost, and incompatibility, especially on older units employing ultrasonic or radio frequency transmitters.

Because the number of home entertainment devices which employ remote controls has increased in recent years, users must have a way to easily organize a large number of remote controls which permits quick visual inspection to determine which remote controls are in the holder and which ones are missing.

SUMMARY

My invention consists of a holder with at least two shelves to hold remote controls. The holder could have a large number of shelves; however, its preferred embodiment consists of four shelves to hold four remote controls. Each remote control has its own location so a quick visual inspection alerts the user if any remote control is missing.

An attachment means such as hook and loop fastener strips are attached to each shelf and matching hook and loop fastener strips are attached to the back of each remote control. Secure attachment by way of hook and loop fastener strips permits the user to easily transport the holder from one location to another without the risk of dropping some of the remote controls.

The shelves above the lower fixed shelf are attached to the vertical support member of the holder by way of a pivotal fastening means such as a hinge. Access to lower shelves is made possible by raising the hinged shelves; because the remote controls on the upper folding shelves are secured to the shelf by means of hook and fastener strips, the remote control remains on its shelf even when the shelf is in a vertical position.

My invention offers a permanent location on the holder to store a large number of remote controls. It allows the user to see, at a glance, if any remote controls are missing. The shelves of the holder can be labeled so the user can easily determine which remote control is missing.

BRIEF DESCRIPTION OF THE DRAWINGS

These and other features, aspects, and advantages of the present invention will become better understood with regard to the following description, appended claims, and accompanying drawings where:

DESCRIPTION

The Holder for Electronic Remote Controls comprises at least two shelves to hold remote controls. The shelves attach to the vertical support member of the holder. The folding shelves attach to the vertical support member of the holder by means of a pivotal fastening means such as a hinge which allows the folding shelves to be raised to permit access to the shelf/shelves below. The holder defines a location for each remote control so the user can easily determine if a remote control is missing and which remote control is not in its proper location in the holder.

Figure 1:
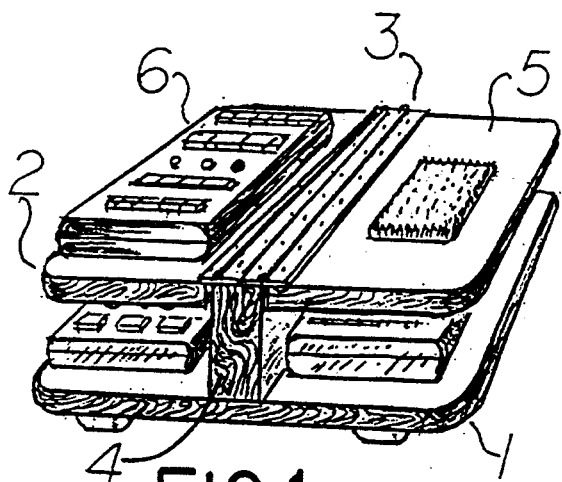
FIG. 1 is a perspective view of the remote control holder showing an embodiment with four shelves.

The embodiment shown in FIG. 1 consists of four shelves 1 and 2 which are connected to vertical support member 4. One remote control rests on each of the shelves. Each folding shelf 2 is connected to the vertical support member of the holder 4 by means of a hinge 3 which permits the folding shelf to be raised to allow access to the fixed shelf 1. Hook and loop fastener strip 5 is mounted on each shelf to allow secure attachment of the remote control 6.

Figure 2:
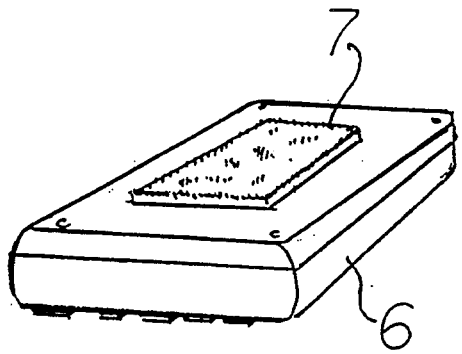
FIG. 2 is a perspective view of the back of a remote control.

As shown in FIG. 2 matching hook and loop fastener strip 7 is mounted on the back of each remote control 6. The hook and loop fastener serves two functions. It permits the user to transport the holder without the risk a remote control might fall out and become lost or damaged. The velcro also holds the remote control 6 securely to folding shelf 2 when the shelf is in vertical position to permit access to the shelf below it as shown in FIG. 3.

Although the holder could accommodate eight or more shelves, the preferred embodiment of the holder has four shelves. If more than four shelves are used, the hinge 3 on the folding shelves 2 must be offset from the vertical support member 4 to leave room for the remote control 6 when the folding shelf 2 is in its almost vertical position (see FIG. 4). The auxiliary folding shelf 10 connects to the vertical support member 4 by means of a second pivoting means or hinge 3. In a design with more than four shelves, the auxiliary folding shelf 10 permits access to folding shelves below the auxiliary folding shelf.

Figure 3:
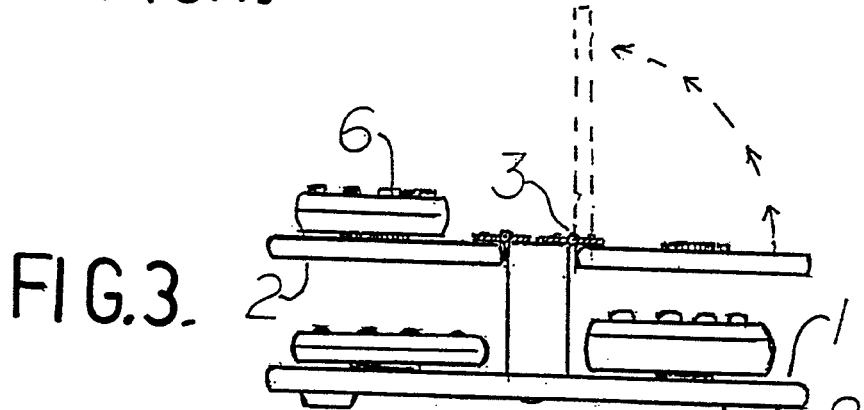
FIG. 3 is an elevation view showing the remote control holder and the hinged shelf range of motion.
Figure 4:
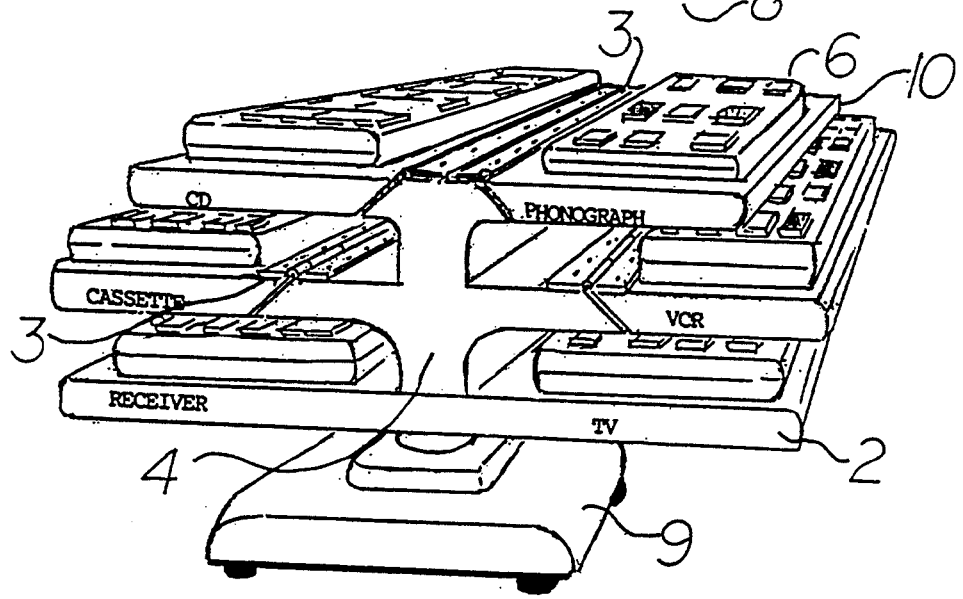
FIG. 4 is a perspective view of the remote control holder showing an embodiment with six shelves.

The holder base could be in the form of feet 8 as shown in FIG. 3 or a pedestal 9 as shown in FIG. 4. As shown in FIG. 4, labels can be applied to each shelf to fix the location of each remote control and to allow the user to determine exactly which remote control is missing.

The holder could be made of plastic, metal or wood. In its preferred embodiment, the holder is made of wood so it looks most like a piece of furniture.

I claim:

1. An apparatus for holding and displaying handheld remote controls and the like, the apparatus comprising:
    a) a vertical support member;
    b) at least one horizontal fixed shelf connected to the vertical support member;
    c) at least one folding shelf, positioned above said fixed shelf by a distance sufficient for said remote control to be located on said fixed shelf when said folding shelf is in a horizontal position;
    d) a pivotal fastening means for fastening said folding shelf to said vertical support member such that in its lower position, said folding shelf is in a horizontal position, and in its upper position, said folding shelf is in approximately a vertical position;
    e) an attaching means on at least one of said shelves for attaching said remote control to said shelf.

2. The device of claim 1 further comprising a base, said base connected to said fixed shelf.

3. The device of claim 1 further comprising a base, said base attached to said vertical support member.

4. A device as in claim 1 which further comprises at least one auxiliary folding shelf, said auxiliary folding shelf positioned above said folding shelf by a distance sufficient for said remote control to be located on said folding shelf when said auxiliary folding shelf is in a horizontal position, and further comprising a second pivotal fastening means for fastening said auxiliary folding shelf to said vertical support member such that in its lower position, said auxiliary folding shelf is in a horizontal position and in its upper position, said auxiliary folding shelf is in approximately a vertical position.

5. A device as in claim 2 which further comprises at least one auxiliary folding shelf, said auxiliary folding shelf positioned above said folding shelf by a distance sufficient for said remote control to be located on said folding shelf when said auxiliary folding shelf is in a horizontal position, and further comprising a second pivotal fastening means for fastening said auxiliary folding shelf to said vertical support member such that in its lower position, said auxiliary folding shelf is in a horizontal position and in its upper position, said auxiliary folding shelf is in approximately a vertical position.

6. A device as in claim 3 which further comprises at least one auxiliary folding shelf, said auxiliary folding shelf positioned above said folding shelf by a distance sufficient for said remote control to be located on said folding shelf when said auxiliary folding shelf is in a horizontal position, and further comprising a second pivotal fastening means for fastening said auxiliary folding shelf to said vertical support member such that in its lower position, said auxiliary folding shelf is in a horizontal position and in its upper position, said auxiliary folding shelf is in approximately a vertical position.

7. A device as in claim 1 wherein the attaching means comprises a hook and loop fastener strip attached to at least one shelf, whereby said remote control with a matching hook and loop fastener may be attached to the shelf.

* * * * *